(No Model.)

F. R. PARTRIDGE.
REVERSIBLE SCREW DRIVER.

No. 266,642. Patented Oct. 31, 1882.

Witnesses
S. N. Piper
E. D. Pratt

Inventor
Frank R. Partridge,
by R. H. Eddy, att'y

N. PETERS, Photo-Lithographer, Washington, D. C.

UNITED STATES PATENT OFFICE.

FRANK R. PARTRIDGE, OF AUGUSTA, MAINE.

REVERSIBLE SCREW-DRIVER.

SPECIFICATION forming part of Letters Patent No. 266,642, dated October 31, 1882.

Application filed July 10, 1882. (No model.)

*To all whom it may concern:*

Be it known that I, FRANK R. PARTRIDGE, of Augusta, in the county of Kennebec, of the State of Maine, have invented a new and useful Improvement in Reversible Screw-Drivers; and I do hereby declare the same to be described in the following specification and represented in the accompanying drawings, of which—

Figure 1:
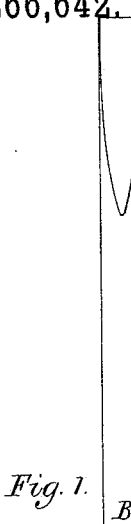
Figure 6:
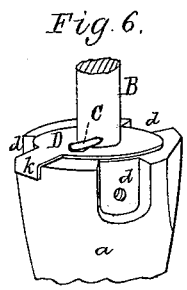
Figure 5:
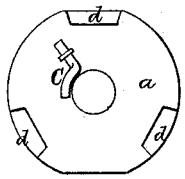
Figure 3:
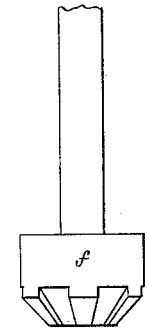
Figure 4:
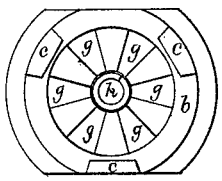
Figure 2:
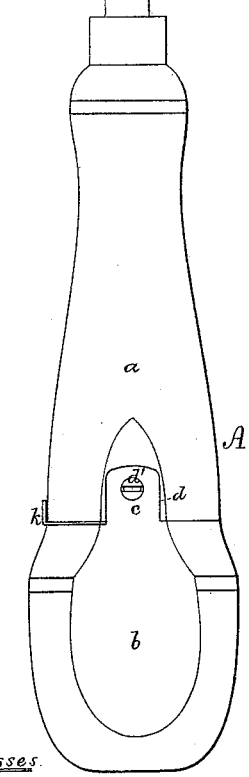
Figure 2:
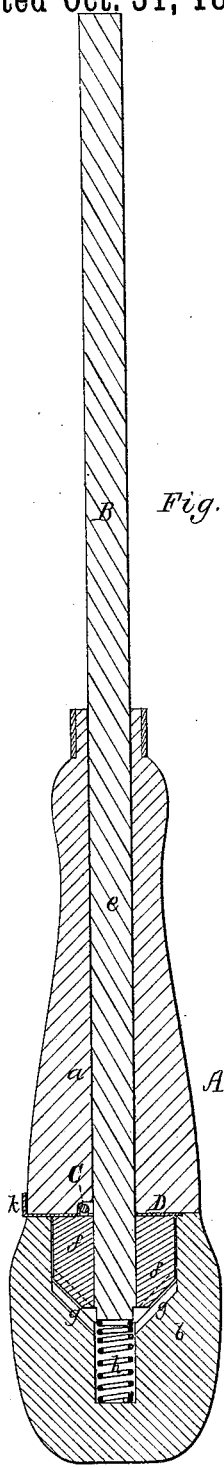

Figure 1 is a side view, and Fig. 2 a longitudinal section, of a screw-driver provided with my invention, whose nature is defined in the claims hereinafter presented. Fig. 3 is a side view of the blade and its portion of the clutch, to be described. Fig. 4 is a top view of the lower section of the handle, with its portion of the said clutch. Fig. 5 is a bottom view of the upper section of the handle. Fig. 6 is a perspective view of the inclined arm and its actuator, to be described.

In this screw-driver the handle A is made in two sections, $a\ b$, the lower, $b$, of which is provided at its upper part with a series of ears, $c$, projecting from it into corresponding notches or recesses, $d$, made in the upper section, $a$. A screw, $d'$, goes through each ear and is screwed into the upper section, and serves, with the ear, to aid in connecting the two sections. The upper section is tubular to receive and support and freely revolve on the cylindrical shank $e$ of the screw-driver blade B. The said shank, at or near its lower or inner end, has fixed upon it the male portion $f$ of a clutch, the female portion of such clutch being shown at $g$ as in and part of the section $b$ of the handle. The portion $f$ of the clutch is cylindrical, except at its lower end, which is conical and provided with teeth, like those of a bevel-gear. The female portion of the clutch is the counterpart of the lower end of the portion $f$, the teeth of each portion being formed to enter the spaces between those of the other in order to couple the two portions together. Within the section $b$ is a spiral spring, $h$, which is to press the clutch portion $f$ out of engagement with its fellow portion, $g$, on the handle being relieved from pressure tending to advance it on the blade, and thereby clutch the handle to the blade. On the blade being inserted in the nick of the head of a screw and the handle being pressed forward, the spring will be contracted endwise and the blade will be clutched to the handle, so as to turn with it on the handle being revolved. On relieving the handle from the force tending to advance it on the blade the spring will unclutch the handle and blade, so as to admit of the handle being turned on and independently of the blade, from which it will be seen that by repeatedly pressing the handle forward and turning it and allowing it to recede on the blade and turning the handle in the reverse direction the blade may be intermittently revolved, such revolution of the blade being so as to either set in or out the screw, as occasion may require.

With the revoluble screw-driver so made there is combined mechanism for effecting the clutching of the handle and blade, or the keeping them clutched in case when it may be desirable not to have the handle revolve on the shank of the blade in order to effect a revolution of the blade. This mechanism consists of the arm C and its actuator D. The said arm is pivoted to the upper section of the handle and inclined to the base thereof, and extends obliquely through the actuator, which is a metallic disk arranged between the two handle-sections and to revolve on the shank of the blade, there being extended from the disk at its periphery, to and beyond the outer side of the handle, a projection, $k$. To enable a person by such to effect turning of the actuator toward the junction of the arm and handle-section, the arm will be moved against the clutch portion $f$, so as to force it into or keep it in engagement with its fellow portion, $g$, and thereby clutch the blade to the handle. On revolving the actuator the opposite way the arm will be moved toward the upper handle-section, so as to allow the spring to force the blade forward to carry its clutch portion out of engagement with the handle part of the clutch.

I make no claim to a reversible screw-driver made as represented in the United States Patent No. 200,747, in which the parts of the clutch are outside of the handle and uncovered, or open to dust or other matter getting between them, such parts in my screw-driver being wholly within one of the sections of the handle and completely covered or inclosed therein, they being in the part or section against which the palm of the hand bears in revolving the screw-driver.

What I claim as my invention is as follows, viz:

1. The reversible screw-driver, substantially as described, having the two sections a b of its handle arranged and connected by ears, and adapted to revolve on the shank of the blade, as set forth, in combination with the said shank, provided at its lower end with the clutch portion f, and with the handle-section b, having the clutch portion g and the spring h arranged in it, to operate with the said clutch portion f, as explained.

2. The combination of the arm C, pivoted to the lower end of the upper section of the handle, and the actuator D, arranged between the two sections and to revolve on the shank of the blade, as explained, with the handle and blade provided with the two clutch portions, and with the spring arranged in one of such portions of the handle, as set forth.

FRANK R. PARTRIDGE.

Witnesses:
J. B. RUSSELL,
LENDALL TITCOMB.